Dec. 27, 1960 C. C. BLAND 2,965,921
METHOD AND APPARATUS FOR PRODUCING GLASS BEADS
FROM A FREE FALLING MOLTEN GLASS STREAM
Filed Aug. 23, 1957
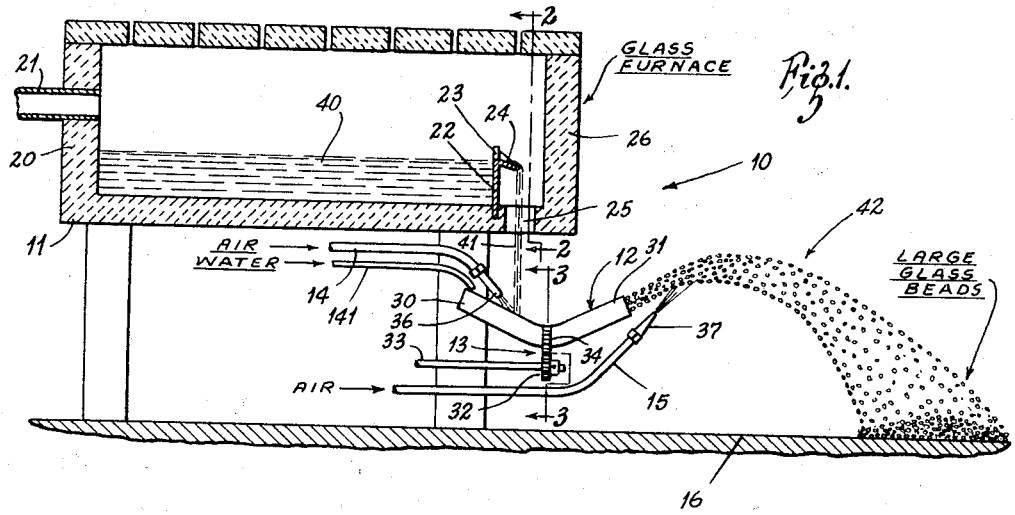
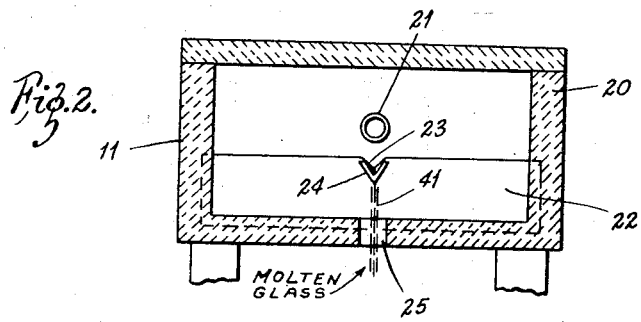
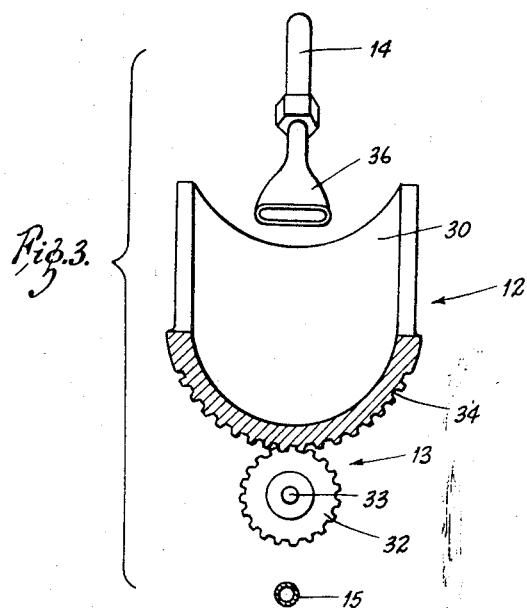
INVENTOR:
CHARLES C. BLAND,
BY Kingsland, Rogers & Ezell
ATTORNEYS

United States Patent Office 2,965,921
Patented Dec. 27, 1960

2,965,921

METHOD AND APPARATUS FOR PRODUCING GLASS BEADS FROM A FREE FALLING MOLTEN GLASS STREAM

Charles C. Bland, St. Louis, Mo., assignor to Flex-O-Lite Manufacturing Corporation, St. Louis, Mo., a corporation of Missouri Filed Aug. 23, 1957, Ser. No. 679,957

5 Claims. (Cl. 18—2.5)

This invention relates to improvements in mass production of glass beads, and in particular is concerned with the mass production of glass beads of a particle size larger than those that have been heretofore obtained in combustion processes.

In the past, glass beads of small particle size have been conventionally prepared and produced in glass furnaces in which ground glass stock was introduced into a furnace in the form of a vertical stack or the like, and upwardly directed glass was burned at a high temperature to carry the beads which were formed in a spherical configuration to the top of the furnace. This type of apparatus is well shown in the patent of Charles C. Bland No. 2,600,963, issued June 17, 1952, and assigned to Flex-O-Lite Manufacturing Corporation, applicant's assignee of the instant application. Such apparatus has been found to be very effective in producing glass beads with the desired configuration but has been limited to beads of small particle size, the largest of which have been approximately 18 mesh or 1/16 inch.

By means of this invention, there has been provided a method and apparatus for producing glass beads of relatively large particle size, comparatively speaking, which range from 1/32 inch upward to about 1/4 inch or so in diameter. The production of such beads in the past has been required to be made by a molding process which is quite expensive, time-consuming and requires special apparatus. Accordingly, through this invention, there has been provided a means for producing in large scale quantities in a mass production type of method and apparatus beads of larger size than those that have been heretofore economically produced. Such beads find utility in a wide number of applications wherever beads of substantially uniform spherical configuration are desired to be employed. Such applications may be of wide variety such as decorative applications, filtering material, paint and chemical grinding mill pebbles, burnishing material, etc., and also as reflective glass spheres used in highway marking paints, roadside signs provided with coatings of paint, enamels, lacquers, asphalts or on thin plastic sheeting in which the beads are embedded.

Essentially, the invention comprises the establishment of a molten glass stock which is dispensed in a free falling stream upon a surface. Upon striking the surface, the molten glass stream is dispersed into individual droplets which are permited to fall freely in space to set to a spherical configuration. The formation of the droplets is aided by direction of a controlled stream of compressed air at the point of intersection with the surface and the free falling stream of molten glass to assist in the dispersion of the beads and to direct the droplets away from the contacting surface. Desirably, the droplets, once they are dispersed from the contacting surface, are permitted to fall freely in space until they set, and to assist in the setting stage a stream of compressed air may be directed upwardly into the dispersed droplets to suspend them and to increase the period of time of their free fall in space. Additionally, it has been found desirable to control the viscosity of the molten glass and the free falling stream in such a manner that beads of the desired size are formed. In general, the viscosity is in the nature of 10 to 30 weight SAE motor oil at room temperature. It has been found that increase in viscosity increases the diameter of the glass beads produced, the upper limit of which is limited by the undesirable formation of glass wool, while a reduction in viscosity decreases the diameter. The force of the compressed air striking the intersection of the glass stream and the contacting surface is also employed to regulate the particle size.

Accordingly, it is a primary object of this invention to provide a method and apparatus for producing glass beads by directing a free falling molten stream of glass upon a contacting surface to disperse the glass in droplets which set to a substantially spherical configuration.

It is a further object of this invention to provide a method and apparatus for producing glass beads of substantial particle size in which a free falling molten stream of glass of controlled viscosity is directed upon a contacting surface and in which dispersed droplets of glass are directed into space to set to spherical glass beads.

It is still another object of this invention to provide a method and apparatus for producing glass beads of substantial particle size in which a free falling molten stream of glass is directed upon a contacting surface and in which compressed air is employed to assist in the dispersion of the glass into glass droplets which are subsequently set in space to spherical glass beads.

Yet another object of this invention is to provide a method and apparatus for producing glass beads of substantial particle size in which a stream of molten glass is directed upon a contacting surface to disperse the glass into droplets and in which there are means for moving the contacting surface to prevent adhesion of glass to the surface.

Yet a further object of this invention is to provide a method and apparatus for producing glass beads of substantial particle size in large quantities in a large scale operation in which a molten glass stream is directed upon a contacting surface and in which the dispersion of the beads into droplets is aided by a fluid under pressure which is directed at the point of intersection of the stream and the contacting surface.

Still another object of this invention is to provide a method and apparatus for producing glass beads of substantial particle size in which a molten glass stream is directed upon a contacting surface to disperse the glass into droplets in space and in which the residence period in spaced is increased by direction of an upwardly directed stream of fluid under pressure to suspend the beads for a substantial period in space.

Still a further object of this invention is to provide a method and appaartus for producing glass beads of substantial particle size on a large scale basis in which the apparatus is relatively inexpensive and simple to operate and requires only a relatively small amount of space and can be operated by relatively unskilled workmen, at low cost.

Further objects of this invention will appear in the detailed description which follows and will be further apparent to those skilled in the art.

For the purpose of illustration of the invention there is shown in the accompanying drawings a preferred embodiment of the apparatus for carrying out this invention. It is to be understood that these drawings are for the purpose of illustration only, and that the invention is not limited thereto.

In the drawings:

Figure 1 is a view in side elevation and partly in section showing the apparatus of this invention;

Figure 2 is a view in section taken along the line 2—2 of Figure 1 showing the construction of the glass furnace employed in this invention; and Figure 3 is an enlarged view in section taken on line 3—3 of Figure 1, showing the construction of the contacting surface and means for varying its position to control the point of contact by the molten stream of glass.

The apparatus of this invention is generally indicated by the reference numeral 10 in Figure 1. The essential components include a glass furnace 11, a contacting surface 12, a control means 13 for moving the contacting surface, a compressed air tube 14 for assisting in the dispersion of the glass droplets and a suspension air tube 15 for suspending the dispersed glass droplets. Water or steam may also be added through tube 141 to aid in setting larger beads and reduce adhesion to shell 30.

The glass furnace is supported upon legs a suitable distance above the floor 16 and is comprised of a ceramic tank 20. A charging chute 21 is situated at the rear of the furnace and is adapted to charge a glass batch to the furnace. Conventional heating means are employed to melt the glass batch and keep the glass in a controlled viscosity molten state, and such heating means will be readily understood although not shown in this drawing. At the forward end of the glass furnace, there is provided a weir plate 22 having a weir notch 23. This plate is made of a suitable metal to prevent the building up of glass accretions. The weir plate 22 is further provided with a spout 24 which is directed downwardly to dispense the liquid in a free falling stream into space through an opening 25 at the bottom of the furnace. It will be noted that the forward wall of the glass furnace is designated at 26 and provides a substantial space for the molten glass to fall through. As a consequence of this particular spacing of the forward wall 26 and the weir plate 22 there is provided a protective heat barrier type of enclosure so that the liquid does not cool substantially which would tend to change the viscosity of the free falling stream.

The contacting surface device 12 is best shown in Figures 1 and 3. The essential element of this device is a hemicylindrical shell 30 which is disposed underneath the spout 24 and the opening 25 of the furnace. This shell is situated so that it may have its inner surface contacted by the falling stream of glass, as will further appear. The contacting shell 30 is connected to an adjacent shell or chute 31, as shown in Figure 1. The chute 31 is also of a hemicylindrical shell-like nature and is employed primarily to direct the dispersed droplets of glass in a controlled manner.

The contacting surface adjustment mechanism 13, as shown in Figures 1 and 3, is employed to rotate the contacting shell 30 about its cylindrical axis. Essentially this mechanism is comprised of a control pinion gear 32 connected to an operating shaft 33. The pinion gear 32 cooperates with a ring gear 34 connected to the underneath side of the contacting shell 30. Suitable bearing means may be employed to support the pinion gear 32 and the contacting shell 30 with its ring gear 34 by conventional means (not shown). The directing shell or chute 31 may be integrally attached to the forward end of the contacting shell 30, in which case it will also be rotated when the contacting shell 30 is rotated. Alternately the chute 31 may be separated, since it is not so subject to the formation of accretion as the contacting shell 30.

The compressed air tube 14 is adapted to be supported by conventional means to direct the outlet stream of compressed air at the point of contact of the molten glass stream on the contacting shell 30. A nozzle 36 may be employed to provide the desired control and direction of the compressed air. Water or steam may also be introduced through tube 141 to assist in the setting of the larger beads and to reduce the undesirable adherence of glass particles to the shell 30.

The glass bead air suspension tube 15 likewise may be suitably supported underneath the surface contacting device. As shown in Figure 1, there is an outlet nozzle 37 that is adapted to be directed underneath the discharge end of the chute 31. In this manner, a source of high velocity air or other compressed fluid may be directed underneath the expelled droplets of beads as they are being formed to suspend them and increase the residence time in free space before the fall upon the floor 16.

Use

In the production of glass beads according to this invention, glass stock is charged to the furnace 11 through the charging chute 21. The glass stock is then subsequently melted to a desired viscosity. This melting is accomplished by conventional gas burners and the like through a controlled viscosity ranging from a viscosity comparable to #10 SAE motor oil all the way up to about #30 SAE motor oil. Desirably a viscosity between 10 and 20 weight SAE motor oil is employed for the formation of glass beads of a general particle size ranging from about 1/32 inch in diameter up to 1/4 inch in diameter.

After the glass stock has melted to form a pool 40, the molten glass is discharged over the weir plate 22 to the weir notch 23. The molten glass is then poured over the spout 24 at the front portion of the furnace through the opening 25. It will be noted that within the front portion of the furnace the free falling molten glass stream is still protectively enclosed within the furnace so that the viscosity cannot change in any significant manner.

The free falling molten glass stream designated 41 is directed upon the contacting surface 30 which is positioned at a generally acute angle. The free falling molten glass stream 41 strikes the interior surface of the contacting shell 30 with some appreciable force and is caused to spatter and disperse into droplets of molten glass. Due to the downwardly slanting or sloping nature of the shell 30, the droplets tend to fall away from the point of impact toward the chute 31.

The dispersion of the glass beads upon the contacting surface 30 is assisted by the compressed air from the conduit 14. This compressed air is desirably at a pressure of 25 to 50 pounds. The compressed air is directed at the point of intersection of the free falling molten glass stream 41 and the surface area that represents the point of impact on the contacting shell 30. Due to the directed nature of the compressed air emanating from the nozzle 36, the glass bead droplets are in effect kicked off the plate down the forward portion of the contacting surface 30 to the chute portion 31.

The glass bead droplets are then directed from the chute 31 in a path 42. The chute 31 is directed substantially upwardly to direct the beads in an arc-like trajectory so that the residence time of free fall in space is increased. The suspending action of the compressed air in the suspension tube 15 also assists in maintaining the glass bead droplets in free space for a longer period of time. A certain cooling action is also attained through the use of the compressed air in the tube 15 as well as from the compressed air tube 14.

As the glass is formed into droplets they set to a solid glass bead in a very short period of time. The cooling is rapid and their suspension in the arc-like path 42 before they fall to the floor 16 provides for a full set to the spherical configuration.

In the production of the glass beads, it has been found desirable under certain circumstances to rotate partially the contacting surface 30 about its axis. This is accomplished by rotating the pinion gear 32 which meshes with the ring gear 34 at the bottom of the contacting shell. By this means, the point of impact of the free falling molten glass stream 41 on the interior of the shell 30 is changed. In effect, this prevents the formation of hot spots and the build-up of glass accretions on the interior surface which would disrupt the process to some extent and affect the production of droplets of glass of uniform size and the ultimate glass beads in the desired form.

By means of this apparatus and method, glass beads in the general particle size of 1/32 to 1/4 inch diameter can be simply produced. In general, the viscosity should be in the neighborhood of #10 SAE motor oil up to about #20 SAE motor oil, or even as high as #30 SAE motor oil. In order to vary the size range, the viscosity may be increased and the air pressure reduced to produce larger size beads. Conversely, where smaller size beads are desired to be produced, the viscosity of the molten glass can be reduced while the air pressure is increased.

It will be apparent to those skilled in the art that the viscosity of the molten glass can be altered by varying the components of the glass stock and by controlling the temperature of the glass furnace. It will also be apparent to those skilled in the art that various combinations of fluids may be used in this process, such as steam and water, to assist in the setting of the droplets of glass to solid glass beads. Similarly, mechanical variants for controlling the movement of the contacting shell 30 may be employed besides the pinion and ring gear arrangement.

Such obvious changes and modifications in the apparatus and method of this invention as are apparent to those skilled in the art are included within the scope of this invention as defined by the claims appended hereto.

What is claimed is:

1. A process for producing glass beads of substantial particle size which comprises melting glass stock to a fluid state, directing a stream of said molten glass at a controlled viscosity comparable to that of about 10 to 30 SAE motor oil into a fall through space by gravity so that they fall forcefully upon a contacting surface having an upwardly inclined end portion to disperse the molten glass into droplets by substantially vertical contact with said surface, applying a compressed fluid stream toward said end portion at the point of contact of said stream and contacting surface for assisting the dispersion of the droplets and directing the droplets in an upward direction and directing a second fluid stream generally concurrently and upwardly underneath the dispersed droplets to direct them into a space for a period of time sufficient to cool them and cause their setting to glass beads.

2. Apparatus for producing glass beads of substantial particle size which comprises means for furnishing a molten glass stock, means for dispensing said molten glass stock in a stream forcefully upon a contacting surface having an upwardly inclined end portion, said contacting surface being positioned in the path of said stream to cause the break up of said stream into droplets of glass by initial contact therewith, means for directing a compressed fluid toward the upwardly inclined end portion at the point of contact of the molten glass stream upon the contacting surface to assist in the dispersion of the molten glass stream into droplets of glass and to direct the droplets away from the contacting surface and upwardly over said end portion freely into a spatial region and against a collecting surface situated below said contacting surface whereby the droplets may set to glass beads.

3. Apparatus for producing glass beads of substantial particle size which comprises furnace means for melting glass stock to a fluid state, discharge means in said furnace for discharging molten glass in a free falling stream, surface contacting means positioned underneath the discharge means in the path of said stream for receiving the free falling stream and dispersing it into droplets of glass, and a collecting surface separated from the contacting surface means to provide a free fall in space for the droplets of glass to set in solid bead form and means for concurrently directing a stream of compressed fluid in an upwardly slanting direction concurrently with the dispersed droplets to suspend them for a period of time and increase their residence in space.

4. Apparatus for producing glass beads of substantial particle size which comprises furnace means for melting glass stock to a fluid state, discharge means in said furnace for discharging molten glass in a free falling stream, surface contacting means positioned underneath the discharge means in the path of said stream for receiving the free falling stream and dispersing it into droplets of glass by initial contact therewith, said means comprising an elongated substantially hemicylindrical open ended shell with the interior facing the free falling stream, means for partially rotating said shell about its axis to vary the point of contact by the molten glass stream to prevent the build-up of glass accretions upon said surface contacting means and a collecting surface separated from the contacting surface means to provide a free fall in space for the droplets of glass to set in solid bead form.

5. Apparatus for producing glass beads of substantial particle size which comprises furnace means for melting glass stock to a fluid state, discharge means in said furnace for discharging molten glass in a free falling stream, surface contacting means positioned underneath the discharge means in the path of said stream for receiving the free falling stream and dispersing it into droplets of glass by initial contact therewith, means for directing a high velocity fluid stream at the point of contact of said free falling stream upon said surface contacting means to assist in the dispersion of said fluid stream, a chute means disposed adjacent the surface contacting means having a glass droplet directing means disposed in an upwardly slanting direction to discharge the droplets in an upward direction to provide a free fall in space for the droplets of glass to set in solid beam form and means for concurrently directing a second high velocity fluid stream upwardly and underneath the dispersed glass droplets as they are discharged from the chute means to increase their residence in space.

References Cited in the file of this patent

UNITED STATES PATENTS

| 6,460 | Smith | May 22, 1849 |
| 92,480 | Shaw | July 13, 1869 |
| 1,026,724 | Trump et al. | May 21, 1912 |
| 2,136,988 | White | Nov. 15, 1938 |
| 2,210,999 | Batholomew | Aug. 13, 1940 |
| 2,311,870 | Richardson et al. | Feb. 23, 1943 |
| 2,569,779 | Porter | Oct. 2, 1951 |
| 2,616,124 | Lyle | Nov. 4, 1952 |
| 2,618,013 | Weigand et al. | Nov. 18, 1952 |